US011667078B2

(12) United States Patent
Natarajan et al.

(10) Patent No.: US 11,667,078 B2
(45) Date of Patent: *Jun. 6, 2023

(54) WATER-BASED BINDERS AND METHODS OF USE IN ADDITIVE MANUFACTURE OF PARTS

(71) Applicant: General Electric Company, Schenectady, NY (US)

(72) Inventors: Arunkumar Natarajan, Mason, OH (US); Kwok Pong Chan, Niskayuna, NY (US); William C. Alberts, Saratoga Springs, NY (US); Vadim Bromberg, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/326,710

(22) Filed: May 21, 2021

(65) Prior Publication Data

US 2021/0370589 A1 Dec. 2, 2021

Related U.S. Application Data

(60) Provisional application No. 63/029,960, filed on May 26, 2020.

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/264* (2017.08); *B29C 64/40* (2017.08);
(Continued)

(58) Field of Classification Search
CPC ....... B29C 64/165; B22F 10/14; B33Y 10/00; B33Y 70/00; B33Y 70/10; B33Y 80/00
See application file for complete search history.

(56) References Cited

U.S. PATENT DOCUMENTS 8,366,825 B2  2/2013  Sabio et al.
8,968,624 B2  3/2015  Tang
(Continued)

FOREIGN PATENT DOCUMENTS

JP  2017007929 A  1/2017
JP  2020511593 A  4/2020

OTHER PUBLICATIONS

Extended European Search Report for EP Application No. 21171795.4 dated Oct. 20, 2021.
(Continued)

Primary Examiner — Mary Lynn F Theisen
(74) Attorney, Agent, or Firm — Dinsmore & Shohl, LLP

(57) ABSTRACT

A method of manufacturing comprises depositing a layer of a powder on a working surface and selectively depositing a water-based binder solution comprising from 0.1 wt % to 5 wt % of a non-aqueous solvent having a boiling point of greater than 100° C. and less than or equal to 175° C. at 1 atm and a thermoplastic binder comprises a first polymer strand including a first functional group and a second polymer strand including a second functional group into the layer of powder in a pattern representative of a structure of a part. The method further comprises non-covalently coupling the first and second polymer strands together via interaction between the first and second functional groups to form a green body part.

20 Claims, 2 Drawing Sheets

(51) Int. Cl.
 *B33Y 80/00* (2015.01)
 *B33Y 70/10* (2020.01)
 *B29C 64/264* (2017.01)
 *B29C 64/40* (2017.01)

(52) U.S. Cl.
 CPC ............... *B33Y 10/00* (2014.12); *B33Y 70/10* (2020.01); *B33Y 80/00* (2014.12)

(56) References Cited

U.S. PATENT DOCUMENTS

| | | |
|---|---|---|
| 9,757,881 B2 | 9/2017 | Tummala et al. |
| 10,189,925 B2 | 1/2019 | Zweig |
| 2015/0232648 A1 | 8/2015 | Hsueh et al. |
| 2016/0368806 A1 | 12/2016 | Yamaguchi et al. |
| 2018/0326484 A1 | 11/2018 | Bonilla Gonzalez et al. |
| 2019/0016109 A1 | 1/2019 | Castanon |
| 2019/0054527 A1* | 2/2019 | Natarajan ............... B22F 1/107 |
| 2019/0217385 A1 | 7/2019 | Bonilla Gonzalez et al. |
| 2020/0013529 A1 | 1/2020 | Nakamura |
| 2021/0187616 A1* | 6/2021 | Tsunoya ............... B28B 11/243 |

OTHER PUBLICATIONS

Japanese Office Action for Japanese Patent Application No. 2021-084922 dated Sep. 27, 2022 (3 pages).

\* cited by examiner

WATER-BASED BINDERS AND METHODS OF USE IN ADDITIVE MANUFACTURE OF PARTS

CROSS-REFERENCE TO RELATED APPLICATIONS

The present application claims the benefit of U.S. Provisional Patent Application Ser. No. 63/029,960 filed May 26, 2020 and entitled "Water-based Binders and Methods of Use for Additive Manufacture of Parts," the entirety of which is incorporated by reference herein.

FIELD

This disclosure relates to additive manufacturing and, more particularly, to water-based binders for use in additive manufacturing processes.

BACKGROUND

Additive manufacturing, also known as 3D printing, is a process in which material is built up layer by layer to form a three-dimensional part. Binder jetting is an additive manufacturing technique based on the use of a binder to join particles of a powder to form a three-dimensional part. In particular, the binder is jetted from a print head onto successive layers of the powder in a build volume, where layers of the powder and the binder adhere to one another to form a green body part. In some applications, the green body part is suitable for end-use. In other applications, subsequent processing, such as removal of the binder and sintering of the powder, may be needed to transform the green body part into a finished, three-dimensional part.

Many binder jetting additive manufacturing processes use binder material systems that require a "curing" step to transform the liquid binder into a solid. Conventional binder solutions may require a long cure time, which can increase the total time required to print a three-dimensional part. A longer cure time decreases the throughput, and therefore the productivity, of the additive manufacturing apparatus.

Accordingly, the need exists for alternative binder solutions that enable decreased cure time and increased throughput of the additive manufacturing apparatus.

SUMMARY

Various embodiments disclosed herein meet these needs by providing a water-based binder solution including a thermoplastic binder and a non-aqueous solvent having a boiling point greater than 100° C. The formulation has a viscosity that is suitable for jetting while enabling faster vaporization of the solvent and, therefore, curing, as compared to conventional binders. Additional features and advantages will be described in greater detail below.

According to a first aspect disclosed herein, a method of manufacturing comprises: depositing a layer of a powder on a working surface; selectively depositing a water-based binder solution comprising from 0.1 wt % to 5 wt % of a non-aqueous solvent having a boiling point of greater than 100° C. and less than or equal to 175° C. at 1 atm and a thermoplastic binder into the layer of powder in a pattern representative of a structure of a part, wherein the thermoplastic binder comprises a first polymer strand including a first functional group and a second polymer strand including a second functional group different from the first functional group. The method further comprises non-covalently coupling the first and second polymer strands together via interaction between the first and second functional groups to form a green body part.

According to a second aspect disclosed herein, a method of manufacturing comprises the method according to the first aspect, wherein the non-aqueous solvent is present in the water-based binder solution in an amount of from 2 wt % to 4 wt %.

According to a third aspect disclosed herein, a method of manufacturing comprises the method according to the first or second aspects, wherein the non-aqueous solvent comprises 2-methoxy ethanol, butanol, 2-butanol, tert-butanol, 1-methoxy-2-propanol, 2-butoxy ethanol, isoamyl alcohol, isobutyl alcohol, ethylene glycol butyl ether, or combinations thereof.

According to a fourth aspect disclosed herein, a method of manufacturing comprises the method according to any one of the first through third aspects, wherein the water-based binder solution has a viscosity of from 8 cP to 12 cP.

According to a fifth aspect disclosed herein, a method of manufacturing comprises the method according to any one of the first through fourth aspects, wherein the first polymer strand has an average molecular weight of from 7,000 g/mol to 50,000 g/mol.

According to a sixth aspect disclosed herein, a method of manufacturing comprises the method according to any one of the first through fifth aspects, wherein first polymer strand has an average molecular weight of from 13,000 g/mol to 23,000 g/mol.

According to a seventh aspect disclosed herein, a method of manufacturing comprises the method according to any one of the first through sixth aspects, further comprising: removing unbound particles from the powder layer around the green body part; relocating the green body part; and curing the thermoplastic binder in the green body part.

According to an eighth aspect disclosed herein, a method of manufacturing comprises the method according to the seventh aspect, wherein curing the thermoplastic binder comprises curing the thermoplastic binder for a time of less than 10 hours.

According to a ninth aspect disclosed herein, a green body part comprises a plurality of layers, each layer formed from a powder bound by a water-based binder solution comprising a thermoplastic binder comprising a first polymer strand including a first functional group and a second polymer strand including a second functional group different from the first functional group; and from 0.1 wt % to 5 wt % of a non-aqueous solvent having a boiling point of greater than 100° C. and less than or equal to 175° C. at 1 atm, wherein the first polymer strand is non-covalently coupled to the second polymer strand via the first and second functional groups.

According to a tenth aspect disclosed herein, a green body part comprises the green body part according to the ninth aspect, wherein the first polymer strand has an average molecular weight of from 7,000 g/mol to 50,000 g/mol.

According to an eleventh aspect disclosed herein, a green body part comprises the green body part according to the ninth or tenth aspects, wherein the first polymer strand has an average molecular weight of from 13,000 g/mol to 23,000 g/mol.

According to a twelfth aspect disclosed herein, a green body part comprises the green body part according to any one of the ninth through eleventh aspects, wherein the second polymer strand has an average molecular weight of from 100 g/mol to 5,000 g/mol.

According to a thirteenth aspect disclosed herein, a green body part comprises the green body part according to any one of the ninth through twelfth aspects, wherein the second polymer strand has an average molecular weight of from 500 g/mol to 5,000 g/mol.

According to a fourteenth aspect disclosed herein, a green body part comprises the green body part according to any one of the ninth through thirteenth aspects, wherein the first polymer strand is selected from the group consisting of polyvinyl alcohol (PVA), polyacryl amide (PAAm), derivatives thereof and combinations thereof, and the second polymer strand is selected from the group consisting of polyacrylic acid (PAA), polymethyl methacrylate (PMMA), polyvinyl methyl ether-maleic anhydride (PVME-MA), derivatives thereof, and combinations thereof.

According to a fifteenth aspect disclosed herein, a water-based binder solution for use in additive manufacturing comprises a thermoplastic binder comprising a first polymer strand comprising a first functional group and a second polymer strand comprising a second functional group, wherein the first and second functional groups are configured to non-covalently couple the first and second polymer strands; from 1 wt % to 5 wt % of a non-aqueous solvent having a boiling point of greater than 100° C. and less than or equal to 175° C. at 1 atm; and water.

According to a sixteenth aspect disclosed herein, a water-based binder solution comprises the water-based binder solution according to the fifteenth aspect, wherein the non-aqueous solvent is present in an amount of from 2 wt % to 4 wt %.

According to a seventeenth aspect disclosed herein, a water-based binder solution comprises the water-based binder solution according to the fifteenth or sixteenth aspects, wherein water-based binder solution has a viscosity of from 8 cP to 12 cP.

According to an eighteenth aspect disclosed herein, a water-based binder solution comprises the water-based binder solution according to any one of the fifteenth through seventeenth aspects, wherein the non-aqueous solvent has a boiling point of less than 175° C. at 1 atm.

According to a nineteenth aspect disclosed herein, a water-based binder solution comprises the water-based binder solution according to any one of the fifteenth through eighteenth aspects, wherein the non-aqueous solvent is a first non-aqueous solvent having a boiling point of greater than or equal to 150° C. and less than or equal to 175° C. at 1 atm, the water-based binder solution further comprising: a second non-aqueous solvent having a boiling point of greater than or equal to 115° C. and less than or equal to 150° C. at 1 atm; wherein the first non-aqueous solvent is present in an amount from 1 wt % to 3 wt %, and the second non-aqueous solvent is present in an amount from 2 wt % to 7 wt % based on the total weight of the water-based binder solution.

According to a twentieth aspect disclosed herein, a water-based binder solution comprises the water-based binder solution according to any one of the fifteenth through nineteenth aspects, wherein the water-based binder solution is free of solvents having a boiling point of greater than 175° C.

Additional features and advantages of the embodiments disclosed herein will be set forth in the detailed description, which follows, and in part will be readily apparent to those skilled in the art from that description or recognized by practicing the disclosed embodiments as described herein, including the detailed description that follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description serve to explain the principles and operations thereof.

DETAILED DESCRIPTION

Figure 1:
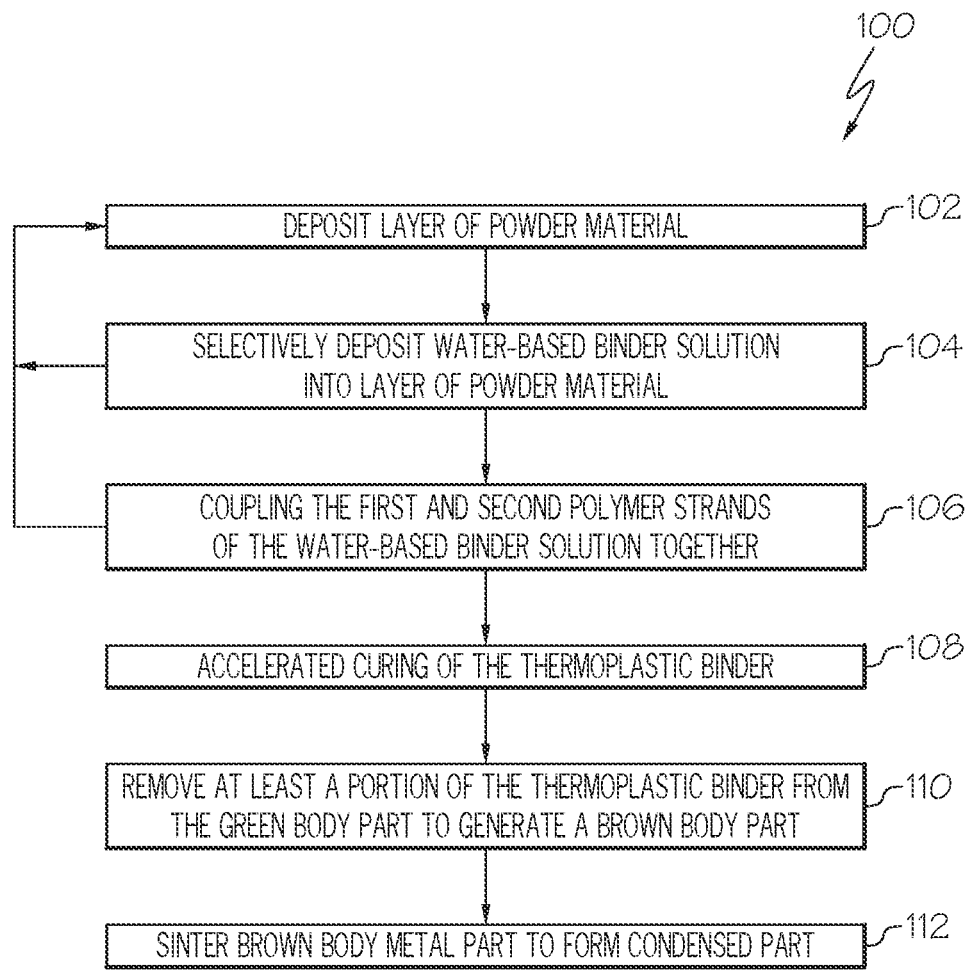
FIG. 1 is a flow diagram of an example method of manufacturing a part via additive manufacturing using a water-based binder solution including a thermoplastic binder according to one or more embodiments shown and described herein.

Reference will now be made in detail to the present preferred embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, for example by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

As used herein, "non-covalently couple" means that the first and second functional groups interact with one another via weak non-covalent forces, such as interactions or bonds, to link or otherwise couple strands of the thermoplastic polymer. As used herein, the phrase "weak non-covalent forces" is intended to denote hydrogen bonding, ionic bonding, Van der Waals forces, and the like.

As used herein, the phrases "green body metal part" and "green body part" denote a part that has not undergone heat treatment to remove the chemical binder. As used herein, the phrases "brown body metal part" and "brown body part" denote a part that has undergone heat treatment to remove the chemical binder. As used herein, a "metal part" means a part having metallic materials. While various embodiments are described in the context of metal parts, the binder solutions described herein are applicable to a wide variety of parts, including but not limited to, polymer and ceramic parts.

As used herein, the term "water" includes deionized water, distilled water, and tap water, unless otherwise specified. In embodiments, water is ASTM D1193 type IV water or better.

In many binder jetting additive manufacturing processes, a chemical binder (e.g., a polymeric adhesive) is used to bond layers of powder to one another to form a three-dimensional object. The chemical binder may be, for example, a polymeric adhesive that is selectively deposited onto a powder bed in a pattern representative of a structure of the part being manufactured. Many binder material systems require "curing" (e.g., via heat, light, moisture, solvent evaporation, etc.) after printing to transform the liquid binder into a solid. However, the cure time can significantly lengthen the total time needed to print an object, which in turn decreases the throughput of the additive manufacturing apparatus.

Accordingly, various embodiments described herein include a water-based binder solution including a thermoplastic binder and a non-aqueous solvent having a boiling point of greater than 100° C. and less than or equal to 175° C. at 1 atm. The increased vapor pressure of the water-based binder solution results in faster layer-by-layer drying during printing, which may, in turn, enable higher throughput by the additive manufacturing machine as compared to conventional binder solutions. These and additional advantages will be described in greater detail below.

As set forth above, in various embodiments, the water-based binder solution includes a thermoplastic binder and a non-aqueous solvent having a boiling point of greater than 100° C. and less than or equal to 175° C. at 1 atm. When deposited into a layer of powder, as will be described in greater detail below, the thermoplastic binder bonds successive layers and provides a certain degree of strength to the part such that the integrity of the structure of the green body part is not affected during post-printing processes, such as depowdering or removal of the part from the working surface.

In various embodiments, the thermoplastic binder comprises a first polymer strand and a second polymer strand. In embodiments, the thermoplastic binder is a thermoplastic binder that generally decomposes with very low char yields without requiring the presence of oxygen ($O_2$) (e.g., in vacuum, inert, or reducing atmospheres). Accordingly, in embodiments, the thermoplastic binder may be cleanly and readily removed from the part during sintering, generating a consolidated part that is substantially free of the thermoplastic binder and decomposition products that may be generated during heat treatment of a printed metal part, including, but not limited to, metal oxides and char.

The first polymer strand includes at least a first functional group. Functional groups of the first thermoplastic polymer strand can include, by way of example and not limitation, hydrogen bond donors, hydrogen bond acceptors, negatively charged groups, positively charged groups, or combinations thereof. In embodiments, the first functional group of the first polymer strand complements a functional group of the second polymer strand of the thermoplastic binder to facilitate non-covalent coupling of the first and second polymer strands. For example, in various embodiments, the first functional group incorporated into the backbone of the polymer strand and is selected from hydroxyl groups, carboxylate groups, amine, thiol, amide, or other suitable functional groups that enable weak, non-covalent coupling (e.g., hydrogen bonding) of the first and second polymer strands.

In various embodiments, the first polymer strand includes polymers such as, but not limited to, polyvinyl alcohol (PVA), polyamides, polyacryl amide (PAAm), polyvinyl methyl ether maleic anhydride (PVME-MA), polyvinylpyrrolidone (PVP), derivatives thereof, and combinations thereof. In embodiments, the first polymer strand has an average molecular weight (Mw or weight average) of from 7,000 g/mol to 50,000 g/mol. For example, the first polymer strand may have an average molecular weight of from 7,000 g/mol to 50,000 g/mol, from 7,000 g/mol to 30,000 g/mol, from 7,000 g/mol to 25,000 g/mol, from 7,000 g/mol to 23,000 g/mol, from 9,000 g/mol to 50,000 g/mol, from 9,000 g/mol to 30,000 g/mol, from 9,000 g/mol to 25,000 g/mol, from 9,000 g/mol to 23,000 g/mol, from 13,000 g/mol to 50,000 g/mol, from 13,000 g/mol to 30,000 g/mol, from 13,000 g/mol to 25,000 g/mol, from 13,000 g/mol to 23,000 g/mol, from 23,000 to 50,000 g/mol, from 23,000 g/mol to 30,000 g/mol, from 23,000 g/mol to 25,000 g/mol, from 25,000 g/mol to 50,000 g/mol, from 25,000 g/mol to 30,000 g/mol, or from 30,000 g/mol to 50,000 g/mol, including any and all ranges and subranges in between.

The first polymer strand is present in the water-based binder solution in an amount of from 1 wt % to 15 wt %, from 1 wt % to 10 wt %, from 1 wt % to 7 wt %, from 3 wt % to 15 wt %, from 3 wt % to 10 wt %, or from 3 wt % to 7 wt %, based on a total weight of the water-based binder solution, including any and all ranges and subranges in between.

The second polymer strand includes at least a second functional group different from the first functional group of the first polymer strand. Functional groups of the second thermoplastic polymer strand can include, by way of example and not limitation, hydrogen bond donors, hydrogen bond acceptors, negatively charged groups, positively charged groups, or combinations thereof. In embodiments, the second functional group of the second polymer strand complements the first functional group of the first polymer strand of the thermoplastic binder to facilitate non-covalent coupling of the first and second polymer strands. For example, in various embodiments, the second functional group may be selected from hydroxyl groups, carboxylate groups, amine, thiol, amide, or other suitable functional groups that enable weak, non-covalent coupling of the first and second polymer strands.

In various embodiments, the second polymer strand includes polymers such as, but not limited to, polyacrylic acid (PAA), poly methacrylic acid (PMAA), polyacrylamide (PAAm), derivatives thereof, and combinations thereof. In embodiments, the second polymer strand has an average molecular weight (Mw or weight average) of from 100 g/mol to 10,000 g/mol, or from 500 g/mol to 10,000 g/mol. For example, the second polymer strand may have an average molecular weight of from 100 g/mol to 10,000 g/mol, from 100 g/mol to 5,000 g/mol, from 500 g/mol to 10,000 g/mol, from 500 g/mol to 5,000 g/mol, or from 5,000 g/mol to 10,000 g/mol, including any and all ranges and subranges in between.

In embodiments, the particular polymer selected as the second polymer strand can vary depending on the particular polymer selected as the first polymer strand. For example, the first polymer strand can be PVA and the second polymer strand can be PAA. Other polymer combinations can be used, provided their functional groups are able to form non-covalent bonds with one another. For example, in embodiments, one of the functional groups is a hydrogen donor, while the other functional group is a hydrogen acceptor.

The second polymer strand is present in the water-based binder solution in an amount of from 0.5 wt % to 10 wt %, from 0.5 wt % to 9 wt %, from 0.5 wt % to 8 wt %, from 0.5 wt % to 7 wt %, from 0.5 wt % to 6 wt %, from 0.5 wt % to 5 wt %, or from 1 wt % to 5 wt %, based on a total weight of the water-based binder solution, including any and all ranges and subranges in between.

The first polymer strand and the second polymer strand are included in the water-based binder solution in amounts to enable a suitable degree of coupling between the first polymer strand and the second polymer strand to yield a green body part having a green strength suitable for handling during post-printing processes. In addition, the first polymer strand and the second polymer strand are present in amounts such that the water-based binder solution has a viscosity of from about 2 centipoise (cP) to about 40 cP using a rheometer. In embodiments, the water-based binder solution has a viscosity of from 2 cP to 40 cP, from 2 cP to 35 cP, from 2 cP to 30 cP, from 2 cP to 25 cP, from 2 cP to 20 cP, from 2 cP to 15 cP, from 2 cP to 12 cP, from 4 cP to 40 cP, from 4 cP to 35 cP, from 4 cP to 30 cP, from 4 cP to 25 cP, from 4 cP to 20 cP, from 4 cP to 15 cP, from 4 cP to 12 cP, from 6 cP to 40 cP, from 6 cP to 35 cP, from 6 cP to 30 cP, from 6 cP to 25 cP, from 6 cP to 20 cP, from 6 cP to 15 cP, from 6 cP to 12 cP, from 8 cP to 40 cP, from 8 cP to 35 cP, from 8 cP to 30 cP, from 8 cP to 25 cP, from 8 cP to 20 cP, from 8 cP to 15 cP, from 8 cP to 12 cP, including any and all ranges and subranges in between. In various embodiments, the weight % ratio of the first polymer strand to the second polymer strand is 1:1, 2:1, 3:1, 4:1, 5:1, 6:1, 8:1, 10:1, or any other suitable ratio. In particular embodiments, the first polymer strand is present in an amount of from 4 wt % to 6 wt % and the second polymer strand is present in an amount of from 1 wt % to 2 wt %, and the weight % ratio is from 6:1 to 2:1.

In various embodiments, the thermoplastic binder is present in the water-based binder solution in an amount of greater than or equal to 1.5 wt %, based on a total weight of the water-based binder solution. For example, the thermoplastic binder may be present in an amount of from greater than from greater than or equal to 1.5 wt % to 25 wt %, from greater than or equal to 2 wt % to 20 wt %, from greater than or equal to 4 wt % to 15 wt %, or from greater than or equal to 5 wt % to 12 wt %, based on the total weight of the water-based binder solution.

In addition to the thermoplastic binder, the water-based binder solution includes a non-aqueous solvent having a boiling point of greater than 100° C. and less than or equal to 175° C. at 1 atm. The non-aqueous solvent is generally non-reactive (e.g., inert) such that it does not react with the powder material, the thermoplastic binder, or other additives that may be included in the water-based binder solution. The non-aqueous solvent can be, by way of example and not limitation, 2-methoxy ethanol, butanol, 2-butanol, tert-butanol, 1-methoxy-2-propanol, 2-butoxy ethanol, isoamyl alcohol, isobutyl alcohol, ethylene glycol butyl ether, or combinations thereof. In embodiments, the secondary solvent choices are selected based on the ease of vaporization with IR lamp energy and can enable less post-curing time (up to 50% less) for full build box builds either on machine cure (e.g., 75-130° C. for 4-8 hours) or post-cure in conventional oven (e.g., 150-170° C. for 4-8 hours) as compared to control binders including high boiling solvents like ethylene glycol. Moreover, the particular non-aqueous solvent can be selected based at least in part on the first and second polymer strands and any other additives that may be included in the water-based binder solution.

In various embodiments, the non-aqueous solvent has a boiling point of greater than 100° C. and less than or equal to 175° C., greater than or equal to 125° C. and less than or equal to 175° C., greater than or equal to 150° C. and less than or equal to 175° C., or greater than or equal to 165° C. and less than or equal to 175° C., including any and all ranges and subranges in between.

Without being bound by theory, it is believed that limiting the use of non-aqueous solvents that have a boiling point of greater than 100° C. can increase the vapor pressure of the water-based binder solution and decrease the cure energy requirement while maintaining the viscosity and wicking properties of the water-based binder solution. However, solvents that have a boiling point of greater than 175° C. were found to generally increase post-curing time by up to 50%. Accordingly, in various embodiments, the non-aqueous solvent is included in the water-based binder solution in an amount of from 0.1 wt % to 6 wt % based on a total weight of the water-based binder solution. For example, the non-aqueous solvent may be included in the water-based binder solution in an amount of from 0.1 wt % to 6 wt %, from 0.1 wt % to 5 wt %, from 0.1 wt % to 4 wt %, from 1 wt % to 6 wt %, from 1 wt % to 5 wt %, from 1 wt % to 4 wt %, from 2 wt % to 6 wt %, from 2 wt % to 5 wt %, or from 2 wt % to 4 wt %, including any and all ranges and subranges in between. Moreover, in embodiments, the water-based binder solution is free of solvents having a boiling point of greater than 200° C., greater than 195° C., greater than 190° C., greater than 185° C., greater than 180° C., or greater than 175° C. at 1 atm.

In some embodiments, the water-based binder solution includes a first non-aqueous solvent having a boiling point of greater than or equal to 150° C. and less than or equal to 175° C. and a second non-aqueous solvent having a boiling point of greater than or equal to 115° C. and less than or equal to 150° C. In such embodiments, the first non-aqueous solvent is present in an amount of from 0.1 wt % to 3 wt %, from 1 wt % to 3 wt %, or from 2 wt % to 3 wt %, based on a total weight of the water-based binder solution, including any and all ranges and subranges in between, and the second non-aqueous solvent is present in an amount of from 0.1 wt % to 7 wt %, from 1 wt % to 7 wt %, from 2 wt % to 7 wt %, from 3 wt % to 7 wt %, or from 4 wt % to 7 wt %, based on a total weight of the water-based binder solution, including any and all ranges and subranges in between.

In embodiments, the water-based binder solution may optionally include one or more additives, such as additives that may facilitate deposition of the thermoplastic binder into the powder material, improve the wettability of the powder material, modify the surface tension of the water-based binder solution, or the like. Optional additives include surfactants, diluents, viscosity modifiers, dispersants, stabilizers, dyes or other colorants, or other additives known and used in the art. In some embodiments, the water-based binder solution includes at least one surfactant.

Surfactants suitable for use in the water-based binder solution include ionic (e.g., zwitterionic, cationic, or anionic) or non-ionic depending on the properties of the thermoplastic binder and/or powder material. In various embodiments, the surfactant can be 2-[4-(2,4,4-trimethylpentan-2-yl)phenoxy]ethanol (e.g., TRITON™ X-100 available from The Dow Chemical Company), polyoxyethylene (80) sorbitan monooleate (e.g., TWEEN™ 80 available from Croda Americas, Inc.), polyoxyethylene-23-lauryl ether (e.g., BRIJ™ L23 available from Croda Americas, Inc.), alkylene oxide copolymer (e.g., HYPERMER™ KD2 available from Croda Advanced Materials), sodium dodecyl sulfate (SDS), hexadecyltrimethylammonium bromide (CTAB), dodecyltrimethylammonium bromide (DTAB), polypropoxy quaternary ammonium chloride (e.g., VARIQUAT™ CC 42 NS available from Evonik Industries), and combinations thereof.

The water-based binder solution also includes water, which, in various embodiments, comprises the balance of the solution. In various embodiments, water is present in an amount of greater than 80 wt %, greater than 85 wt %, or even greater than 90 wt %, based on a total weight of the water-based binder solution.

Accordingly, in embodiments, the water-based binder solution has a vapor pressure of greater than 17.00 mmHg, greater than 17.10 mmHg, greater than 17.20 mmHg, greater than 17.30 mmHg, or greater than 17.40 mmHg at 1 atm and 20° C. In some particular embodiments, the water-based binder solution has a vapor pressure of from 17.00 mmHg to 18.00 mmHg, from 17.00 mmHg to 17.90 mmHg, from 17.00 mmHg to 17.80 mmHg, from 17.00 mmHg to 17.70 mmHg, from 17.00 mmHg to 17.60 mmHg, from 17.00 mmHg to 17.50 mmHg, from 17.10 mmHg to 18.00 mmHg, from 17.10 mmHg to 17.90 mmHg, from 17.10 mmHg to 17.80 mmHg, from 17.10 mmHg to 17.70 mmHg, from 17.10 mmHg to 17.60 mmHg, from 17.10 mmHg to 17.50 mmHg, from 17.20 mmHg to 18.00 mmHg, from 17.20 mmHg to 17.90 mmHg, from 17.20 mmHg to 17.80 mmHg, from 17.20 mmHg to 17.70 mmHg, from 17.20 mmHg to 17.60 mmHg, from 17.20 mmHg to 17.50 mmHg, from 17.30 mmHg to 18.00 mmHg, from 17.30 mmHg to 17.90 mmHg, from 17.30 mmHg to 17.80 mmHg, from 17.30 mmHg to 17.70 mmHg, from 17.30 mmHg to 17.60 mmHg, from 17.30 mmHg to 17.50 mmHg, from 17.40 mmHg to 18.00 mmHg, from 17.40 mmHg to 17.90 mmHg, from 17.40 mmHg to 17.80 mmHg, from 17.40 mmHg to 17.70 mmHg, from 17.40 mmHg to 17.60 mmHg, or from 17.40 mmHg to 17.50 mmHg at 1 atm and 20° C., including any and all ranges and sub-ranges in between. The increased vapor pressure of the water-based binder solution results in faster layer-by-layer drying during printing, which may, in turn, enable higher throughput by the additive manufacturing machine as compared to conventional binder solutions.

Figure 2:
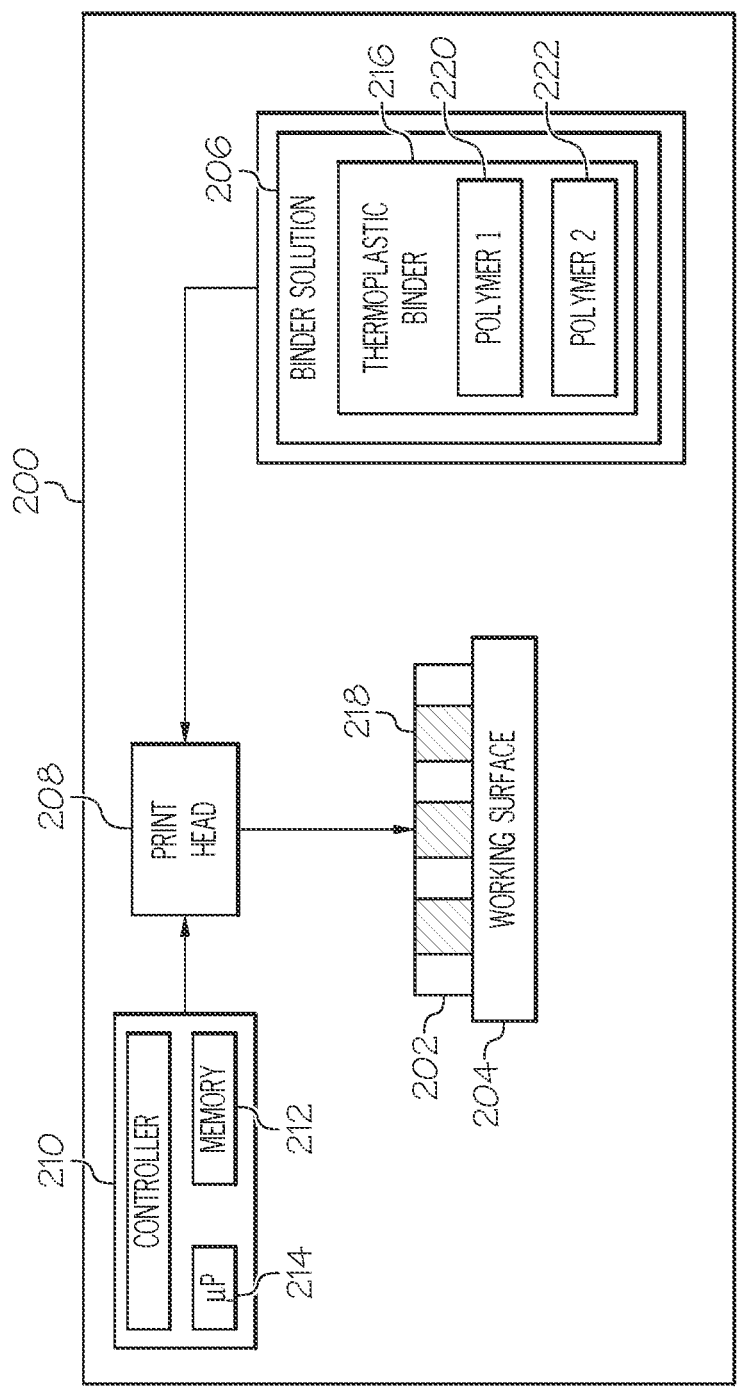
FIG. 2 is a block diagram of an embodiment of an additive manufacturing apparatus used to manufacture the part in accordance with the method of FIG. 1.

FIG. 1 is a block diagram depicting an embodiment of a method 100 for manufacturing an article via additive manufacturing using the water-based binder solutions described herein. To facilitate discussion of aspects of the method 100, reference is made to FIG. 2, which is a block diagram depicting an embodiment of an additive manufacturing apparatus 200 that can be used to perform method 100.

As depicted in FIG. 1, the method 100 begins with depositing a layer of a powder material 202 that is used to manufacture a part (block 102). In various embodiments, the layer of the powder material 202 is deposited on a working surface 204 of the additive manufacturing apparatus. The powder material can be a metal powder, such as a nickel alloy, cobalt alloy, cobalt-chromium alloy, cast alloy, titanium alloy, aluminum-based materials, tungsten, stainless steel, or the like. Other powder materials may be used depending on the particular embodiment.

Next, the method 100 continues with selectively depositing a water-based binder solution 206 into the layer of powder material 202 in a pattern representative of a structure of the part (block 104). The water-based binder solution 206 can be, for example, any one of various embodiments of the water-based binder solution described herein. In various embodiments, the water-based binder solution 206 is selectively printed using a print head 208 that is operated by a controller 210 based on a CAD design that includes a representation of the structure of the part being printed.

In various embodiments, the controller 210 for controlling the print head 208 may include a distributed control system or any suitable device employing a general purpose computer or application-specific device. The controller 210 generally includes memory 212 storing one or more instructions for controlling operation of the print head 208. In embodiments, the memory 212 stores CAD designs representative of a structure of the part being manufactured. In embodiments, the CAD designs can include distortion compensation and, as such, the CAD design may not exactly match the geometry of the final desired part. Additionally, the controller 210 includes at least one processor 214 (e.g., microprocessor), and the memory 212 may include one or more tangible, non-transitory, machine-readable media collectively storing instructions executable by the processor 214 to control actions described herein.

After the water-based binder solution 206 is selectively deposited into the layer of powder material 202, the thermoplastic binder 216 in the water-based binder solution 206 at least partially coats an outer surface of metal powder particles, thereby generating binder-coated particles 218. As will be described, the thermoplastic binder 216 bonds the binder-coated particles 218 according to the pattern of the water-based binder solution 206 printed into the layer of powder material 202 to form a layer of the green body part after curing.

The method 100 may repeat the steps of depositing a layer of powder material (block 102) and selectively depositing the water-based binder solution 206 into the layer of powder material (block 104) to continue building up the part in a layer-by-layer manner until a desired number of layers have been printed. As shown in FIG. 1, the method 100 continues with coupling a first polymer strand 220 and a second polymer strand 222 of the thermoplastic binder together (block 106) through non-covalent hydrogen bonding interactions after curing and/or drying the solvent(s) to create the green body part.

In various embodiments, the first and second polymer strands 220, 222 of the thermoplastic binder 216 are coupled together via interaction between the first and second functional groups of the first and second polymer strands, respectively. For example, in embodiments, a portion of the solvents (both water and the non-aqueous solvent) in the printed layer may be evaporated during deposition of the water-based binder solution 206, although a certain amount of the solvents may remain within the layer of powder material 202. Alternatively or additionally, an IR lamp and/or heated plate can heat the part prior to depowdering to remove at least a portion of the water from the water-based binder solution 206 in an on-machine curing process, thereby leading to formation of green body parts 220, 222. In some embodiments, parts manufactured with the water-based binder solutions described herein may be handled (such as for depowdering and/or removal from the working surface 204 of the additive manufacturing apparatus 200) without any additional curing (referred to herein as "accelerated curing") in a conventional oven since the machine itself can provide curing sufficient to yield green strength capable of withstanding depowdering or removal of the part from the working surface 204.

In various embodiments, the method 100 continues with accelerated curing of the thermoplastic binder (block 108).

For example, the green body part, after all of the layers have been printed, may be thermally cured at a temperature that is suitable for evaporating the solvent remaining in the printed layer and allowing efficient bonding of the printed layers of the green body part. Unbound particles from the powder layer (e.g., the powder material that is not bonded by the water-based binder solution 206) may be removed before or after the curing step of block 108 to prepare the green body part for post-processing steps such as debinding and sintering. In some embodiments, unbound particles are removed from around the green body part and the green body part is relocated (e.g., moved to a location that is not the working surface) for the accelerated curing. In some embodiments, unbound particles are removed from around the green body part and the green body part is subjected to accelerated curing on the working surface 204. Regardless of the location of the accelerated curing, in embodiments, the use of the water-based binder solutions described herein enable curing to be carried out at in less time, and with less overall cure energy (e.g., curing prior to depowdering between 70-130° C.) than an otherwise identical part made with the same powder material and subjected to a binder solution including higher vapor pressure solvents.

In the embodiment depicted in FIG. 1, the method 100 includes removing (e.g., debinding) a portion of the thermoplastic binder from the green body part to generate a brown body part (block 110). In various embodiments, the binders provide strength (e.g., green strength) to the part and, as such, only a portion (i.e., less than all) of the thermoplastic binder is removed during debinding of the green body part.

During the debinding at block 110, the green body part is heated to separate the linked polymer strands and break down a portion of the polymer strands. For example, the green body part may be heated to a temperature that is about 600° C. or less, or about 450° C. or less. In embodiments, the green body part is heated to a temperature of from 250° C. to 450° C. The heating can be performed, for example, in an oxygen-free environment (e.g., in a vacuum chamber under an inert atmosphere), or in air. In embodiments in which the debinding is performed in an inert atmosphere, argon, nitrogen, vacuum, or another substantially inert gas may be used. In some embodiments, the debind step may be combined with the sintering step to in order to make the final consolidated part.

According to various embodiments, the debinding step of block 110 is effective to remove greater than about 95% of the thermoplastic binder. For example, greater than or equal to 95%, greater than or equal to 96%, greater than or equal to 97%, greater than or equal to 98%, or greater than or equal to 99% of the total amount of thermoplastic binder is removed during debinding. In some embodiments, the portion of the thermoplastic binder that remains in the brown body part is less than or equal to 5%, less than or equal to 4%, less than or equal to 3%, less than or equal to 2%, or less than or equal to 1% of the amount of thermoplastic binder that was present prior to the debinding step. In embodiments, the portion of the thermoplastic binder that remains in the brown body part is from 0.05% to 2% or from 0.1% to 1% of the amount of thermoplastic binder that was present prior to the debinding step and is removed in the later stage of sintering process (e.g., beyond 600° C. and into the higher sintering temperatures as described in accordance with block 112).

Following debinding at block 110, the method 100 continues with sintering the brown body part to form the consolidated part (block 112). During sintering, the remaining portion of the thermoplastic binder (e.g., oligomers formed during debinding) is removed from the brown body part and the particles of metal powder are consolidated to form the consolidated part. Sintering imparts strength and integrity to the brown body part such that the consolidated part is suitable for use in machinery, for example.

In some embodiments, sintering may be performed according to a two-step process including a pre-sintering step in which the remaining portion of the thermoplastic binder is removed and a sintering step in which the metal powder particles are consolidated. In some embodiments, sintering may be performed as a single step. During sintering, the brown body part is heated to temperatures of greater than 500° C., greater than 800° C., or greater than 1000° C. In embodiments, heat may be applied by placing the brown body part in a furnace, or by exposing the brown body part to a concentrated source of energy, such as a laser beam, an electron beam, or another suitable energy source, depending on the particular embodiment.

Although various embodiments described herein are described with reference to method 100, it should be understood that embodiments of the water-based binder solution described herein can be used with a variety of methods that are known and used by those skilled in the art. In particular, curing and sintering may be accomplished in a number of different ways, in a number of different steps, and in a number of different locations.

EXAMPLES

The following examples are provided to illustrate various embodiments, but are not intended to limit the scope of the claims. All parts and percentages are by weight unless otherwise indicated. Approximate properties, characters, parameters, etc., are provided below with respect to various working examples, comparative examples, and the materials used in the working and comparative examples. The following materials were used in the examples:

Polymer Strand 1 is a polyvinyl alcohol (PVA);
Polymer Strand 2 is a polyacrylic acid (PAA);
Non-Aqueous Solvent A is ethylene glycol having a boiling point of 197° C. at 1 atm and a vapor pressure of 0.06 mmHg; and
Non-Aqueous Solvent B is ethylene glycol butyl ether having a boiling point of 171° C. at 1 atm and a vapor pressure of 0.8 mmHg.

Six comparative examples (Comparative Examples A-F) and three working examples (Examples 1-3) were prepared using the same first polymer strands and second polymer strands in varying amounts and with varying amounts of non-aqueous solvents. The formulations are provided in Table 1 below, with amounts being reported in wt %, along with the estimated vapor pressure of each formulation.

TABLE 1

Estimated vapor pressure of binder systems

| | Polymer Strand 1 | Polymer Strand 2 | Non-Aq. Solvent A | Non-Aq. Solvent B | Water | Estimated Vapor Pressure (mmHg) |
|---|---|---|---|---|---|---|
| Comp. Ex. A | 4.80 | 0.96 | 4.40 | 8.90 | 80.94 | 16.96 |
| Comp. Ex. B | 5.76 | 1.15 | 5.28 | 10.68 | 77.13 | 16.83 |

TABLE 1-continued

Estimated vapor pressure of binder systems

| | Polymer Strand 1 | Polymer Strand 2 | Non-Aq. Solvent A | Non-Aq. Solvent B | Water | Estimated Vapor Pressure (mmHg) |
|---|---|---|---|---|---|---|
| Comp. Ex. C | 6.72 | 1.34 | 6.16 | 12.46 | 73.32 | 16.68 |
| Comp. Ex. D | 4.80 | 0.96 | 0.00 | 0.00 | 94.24 | 17.50 |
| Comp. Ex. E | 5.76 | 1.15 | 0.00 | 0.00 | 93.09 | 17.50 |
| Comp. Ex. F | 6.72 | 1.34 | 0.00 | 0.00 | 91.94 | 17.50 |
| Sample 1 | 6.72 | 1.34 | 0.00 | 2.00 | 89.94 | 17.44 |
| Sample 2 | 5.76 | 1.15 | 0.00 | 2.00 | 91.09 | 17.44 |
| Sample 3 | 5.76 | 1.15 | 0.00 | 4.00 | 86.09 | — |

As shown in Table 1, the water-based binder solutions (Comparative Examples A-C) including amounts of non-aqueous solvents of greater than 4 wt % exhibited an estimated vapor pressure below 17.00 mmHg. Increasing amounts of Non-Aqueous Solvent A served to lower the vapor pressure of the binder solution. Removal of Non-Aqueous Solvent A increased the vapor pressure above 17.00 mmHg. Comparative Examples D, E, F (each of which also did not include Non-Aqueous Solvent B) exhibited increased vapor pressure over Examples 1 and 2. However, when used to manufacture a part, the water-based binder solutions of Comparative Examples D, E, and F generated parts having rough surfaces. Without being bound by theory, it is believed that the solvent (i.e., water) in Comparative Examples D, E, and F evaporated too quickly, which resulted in a freeze of the wicking of the binder solution into the powder layer. Thus, by incorporating an amount of Non-Aqueous Solvent B, Examples 1 and 2 demonstrated increased vapor pressure over Comparative Examples A-C, while exhibiting desirable wicking behavior and producing parts with a suitable surface finish.

Next, to determine the effect of the change of solvents on the cure rate, the water-based binder solutions of Comparative Examples A-F and Examples 1 and 2 were used to print a part. In particular, the binder solutions of Comparative Examples A-F and Examples 1 and 2 were selectively deposited into a 100 μm layer of powder material (316L SS) using a GE binder jet machine and the above process repeated layer-by-layer to generate a 3D printed green geometry. The temperature of the working build plate was maintained at 65° C. during the whole build process and the green body parts were cured at 130° C. for 2-9 hours in the binder jet machine. After printing, the parts were post-cured in a conventional oven at 200° C. for 6-12 hours for Comparative Examples A-C and at 170° C. for 2-6 hours for Comparative Examples D-F and Sample 1 and 2.

Before depowdering, the part printed with the water-based binder solution of Comparative Examples A-C were cured using two Helios Quarts IR Fast Medium Wave IR lamps having a wavelength of 1.7-2.0 μm at full intensity on machine and followed by conventional oven cure for 6-12 hours at 200° C., as Comparative Examples A-C had green strength too poor to enable depowdering with only machine curing. However, the parts printed with the water-based binder solution of Comparative Examples D-F and Examples 1 and 2 were fully cured after using a single IR lamp at 50-70% intensity and followed by conventional oven curing for 2-6 hours at 170° C. Additional testing demonstrated that an identical part printed with the water-based binder solution of Comparative Example B could alternatively be cured almost to full strength using two IR lamps at 70-100% without any need of post cure in conventional oven.

The green strength of the parts after curing was measured using the Instron 3-point bend test. Specifically, green body parts measuring 105 mm×15 mm×15 mm were placed on a beam which spans 4.1" and the parts were broken with the 3-point bend test along the z-layers (build direction). The part printed with the water-based binder solution of Comparative Example A exhibited a green strength of 75 lbf parallel to X and 45 lbf parallel to Y, while the part printed with the water-based binder solution of Example 1 exhibited a green strength of 97 lbf parallel to X and 89 lbf parallel to Y. Accordingly, despite the significantly shorter cure time, the part printed using the water-based binder solution of Example 1 exhibited a significant increase in green strength in both the X and Y directions. Without being bound by theory, it is believed that the increased green strength can be attributed to the increased amount of thermoplastic binder present in the binder formulation of Example 1 as compared to the amount of thermoplastic binder present in the binder formulation of Comparative Example A (1.4×). However, notably, the significant decrease in cure time did not adversely impact the strength of the green body part. Accordingly, the green body part generated with the binder formulation of Example 1 could be handled (e.g., depowdered, relocated, and subjected to post-print processes) in less time than a green body part generated with the binder formulation of Comparative Example A.

Accordingly, various embodiments described herein include a water-based binder solution including a thermoplastic binder and a non-aqueous solvent having a boiling point of greater than 100° C. and less than or equal to 175° C. at 1 atm. The increased vapor pressure of the water-based binder solution results in faster layer-by-layer drying during printing, which may, in turn, enable higher throughput by the additive manufacturing machine as compared to conventional binder solutions.

Additional testing was done to determine the effect of off-machine curing conditions on the green strength of the parts using different binder compositions. In particular, to form the pucks, 33-34 g of 316L stainless steel powder was placed in a 1.5" diameter silicone mold and 2.5 mL of binder was added drop by drop until all of the binder wicked into the mold. The mold was vibrated for approximately 15 minutes on a vibrating table. Binder composition, curing conditions, and green strength of parts are reported in Table 2.

TABLE 2

Green Strength of Samples at Various Curing Conditions

| | Comp. Ex. A | Comp. Ex. F | Sample 1 | Sample 3 |
|---|---|---|---|---|
| 70° C.; 2 hours | — | 2.69 lbf | 0.26 lbf | — |
| 70° C.; 4 hours | 59.94 lbf | 117.79 lbf | 109.8 lbf | 117.79 lbf |
| 90° C.; 2 hours | 39.72 lbf | 117.65 lbf | 117.35 lbf | 117.97 lbf |
| 130° C.; 2 hours | — | 117.64 lbf | 117.89 lbf | 117.84 lbf |

In Table 2, the reported green strength was measured using the Instron 3-point bend test in which the puck was placed on an Instron machine with a beam support length of 25 mm.

As shown in Table 2, there was not much green strength for any of the binder formulations when cured at 70° C. for 2 hours. When cured at 70° C. for 4 hours, the part prepared using the binder Comparative Example A was partially cured, but did not exhibit the green strength exhibited by the parts prepared with the binders of Comparative Example F (which included both ethylene glycol and ethylene glycol butyl ether) and Samples 1 and 3 (including ethylene glycol butyl ether and water only), which were fully cured.

After curing at a temperature of 90° C. for two hours, the part prepared using the binder of Comparative Example A again was only partially cured, exhibiting a green strength of only 39.72 lbf, while the parts prepared using the binders of Comparative Example F and Samples 1 and 3 were fully cured. Increasing the temperature from 90° C. to 130° C. did not change the green strength of the parts prepared with the binders of Comparative Example F and Samples 1 and 3 when cured for 2 hours.

Accordingly, the results in Table 2 demonstrate that the removal of the non-aqueous boiling point of greater than 175° C. (e.g., the ethylene glycol) enables parts to be fully cured in less time, and results in increased green strength as compared to parts with an otherwise equivalent binder composition, but including a higher boiling point solvent.

Further aspects of the invention are provided by the subject matter of the following clauses:

1. A method of manufacturing comprising: depositing a layer of a powder on a working surface; selectively depositing a water-based binder solution comprising from 0.1 wt % to 5 wt % of a non-aqueous solvent having a boiling point of greater than 100 C and less than or equal to 175° C. at 1 atm and a thermoplastic binder into the layer of powder in a pattern representative of a structure of a part, wherein the thermoplastic binder comprises a first polymer strand including a first functional group and a second polymer strand including a second functional group different from the first functional group; and non-covalently coupling the first and second polymer strands together via interaction between the first and second functional groups to form a green body part.

2. The method of any preceding clause, wherein the non-aqueous solvent is present in the water-based binder solution in an amount of from 2 wt % to 4 wt %.

3. The method of any preceding clause, wherein the non-aqueous solvent comprises 2-methoxy ethanol, butanol, 2-butanol, tert-butanol, 1-methoxy-2-propanol, 2-butoxy ethanol, isoamyl alcohol, isobutyl alcohol, ethylene glycol butyl ether, or combinations thereof.

4. The method of any preceding clause, wherein the water-based binder solution has a viscosity of from 8 cP to 12 cP.

5. The method of any preceding clause, wherein the first polymer strand has an average molecular weight of from 7,000 g/mol to 50,000 g/mol.

6. The method of any preceding clause, wherein first polymer strand has an average molecular weight of from 13,000 g/mol to 23,000 g/mol.

7. The method of any preceding clause, further comprising: removing unbound particles from the powder layer around the green body part; relocating the green body part; and curing the thermoplastic binder in the green body part.

8. The method of any preceding clause, wherein curing the thermoplastic binder comprises curing the thermoplastic binder for a time of less than 10 hours.

9. A green body part comprising a plurality of layers, each layer formed from a powder bound by a water-based binder solution comprising a thermoplastic binder comprising a first polymer strand including a first functional group and a second polymer strand including a second functional group different from the first functional group, and from 0.1 wt % to 5 wt % of a non-aqueous solvent having a boiling point of greater than 100° C. and less than or equal to 175° C. at 1 atm, wherein the first polymer strand is non-covalently coupled to the second polymer strand via the first and second functional groups.

10. The green body part of any preceding clause, wherein the first polymer strand has an average molecular weight of from 7,000 g/mol to 50,000 g/mol.

11. The green body part of any preceding clause, wherein the first polymer strand has an average molecular weight of from 13,000 g/mol to 23,000 g/mol.

12. The green body part of any preceding clause, wherein the second polymer strand has an average molecular weight of from 100 g/mol to 5,000 g/mol.

13. The green body part of any preceding clause, wherein the second polymer strand has an average molecular weight of from 500 g/mol to 5,000 g/mol.

14. The green body part of any preceding clause, wherein the first polymer strand is selected from the group consisting of polyvinyl alcohol (PVA), polyacryl amide (PAAm), derivatives thereof and combinations thereof, and the second polymer strand is selected from the group consisting of polyacrylic acid (PAA), polymethyl methacrylate (PMMA), polyvinyl methyl ether-maleic anhydride (PVME-MA), derivatives thereof, and combinations thereof.

15. A water-based binder solution for use in additive manufacturing comprising: a thermoplastic binder comprising a first polymer strand comprising a first functional group and a second polymer strand comprising a second functional group, wherein the first and second functional groups are configured to non-covalently couple the first and second polymer strands; from 1 wt % to 5 wt % of a non-aqueous solvent having a boiling point of greater than 100° C. and less than or equal to 175° C. at 1 atm; and water.

16. The water-based binder solution of any preceding clause, wherein the non-aqueous solvent is present in an amount of from 2 wt % to 4 wt %.

17. The water-based binder solution of any preceding clause, wherein water-based binder solution has a viscosity of from 8 cP to 12 cP.

18. The water-based binder solution of any preceding clause, wherein the non-aqueous solvent has a boiling point of less than 175° C. at 1 atm.

19. The water-based binder solution of any preceding clause, wherein the non-aqueous solvent is a first non-aqueous solvent having a boiling point of greater than or equal to 150° C. and less than or equal to 175° C. at 1 atm, the water-based binder solution further comprising: a second non-aqueous solvent having a boiling point of greater than or equal to 115° C. and less than or equal to 150° C. at 1 atm; wherein the first non-aqueous solvent is present in an amount from 1 wt % to 3 wt %, and the second non-aqueous solvent is present in an amount from 2 wt % to 7 wt % based on the total weight of the water-based binder solution.

20. The water-based binder solution of any preceding clause, wherein the water-based binder solution is free of solvents having a boiling point of greater than 175° C.

It will be apparent to those skilled in the art that various modifications and variations can be made to embodiment of the present disclosure without departing from the spirit and scope of the disclosure. Thus, it is intended that the present disclosure cover such modifications and variations provided they come within the scope of the appended claims and their equivalents.

What is claimed is:

1. A method of manufacturing comprising:
    depositing a layer of a powder on a working surface;
    selectively depositing a water-based binder solution comprising from 0.1 wt % to 5 wt % of a non-aqueous solvent having a boiling point of greater than 100° C. and less than or equal to 175° C. at 1 atm and a thermoplastic binder into the layer of powder in a pattern representative of a structure of a part, wherein the thermoplastic binder comprises a first polymer strand including a first functional group and a second polymer strand including a second functional group different from the first functional group; and
    non-covalently coupling the first and second polymer strands together via interaction between the first and second functional groups to form a green body part.

2. The method of claim 1, wherein the non-aqueous solvent is present in the water-based binder solution in an amount of from 2 wt % to 4 wt %.

3. The method of claim 1, wherein the non-aqueous solvent comprises 2-methoxy ethanol, butanol, 2-butanol, tert-butanol, 1-methoxy-2-propanol, 2-butoxy ethanol, iso-amyl alcohol, isobutyl alcohol, ethylene glycol butyl ether, or combinations thereof.

4. The method of claim 1, wherein the water-based binder solution has a viscosity of from 8 cP to 12 cP.

5. The method of claim 1, wherein the first polymer strand has an average molecular weight of from 7,000 g/mol to 50,000 g/mol.

6. The method of claim 5, wherein first polymer strand has an average molecular weight of from 13,000 g/mol to 23,000 g/mol.

7. The method of claim 1, further comprising:
    removing unbound particles from the layer of powder around the green body part;
    relocating the green body part; and
    curing the thermoplastic binder in the green body part.

8. The method of claim 7, wherein curing the thermoplastic binder comprises curing the thermoplastic binder for a time of less than 10 hours.

9. A green body part comprising:
    a plurality of layers, at least one layer formed from a powder bound by a water-based binder solution comprising: a thermoplastic binder comprising a first polymer strand including a first functional group and a second polymer strand including a second functional group different from the first functional group; and from 0.1 wt % to 5 wt % of a non-aqueous solvent having a boiling point of greater than 100° C. and less than or equal to 175° C. at 1 atm, wherein the first polymer strand is non-covalently coupled to the second polymer strand via the first and second functional groups.

10. The green body part according to claim 9, wherein the first polymer strand has an average molecular weight of from 7,000 g/mol to 50,000 g/mol.

11. The green body part according to claim 10, wherein the first polymer strand has an average molecular weight of from 13,000 g/mol to 23,000 g/mol.

12. The green body part according to claim 9, wherein the second polymer strand has an average molecular weight of from 100 g/mol to 5,000 g/mol.

13. The green body part according to claim 12, wherein the second polymer strand has an average molecular weight of from 500 g/mol to 5,000 g/mol.

14. The green body part according to claim 9, wherein the first polymer strand is selected from the group consisting of polyvinyl alcohol (PVA), polyacryl amide (PAAm), derivatives thereof and combinations thereof, and the second polymer strand is selected from the group consisting of polyacrylic acid (PAA), polymethyl methacrylate (PMMA), polyvinyl methyl ether-maleic anhydride (PVME-MA), derivatives thereof, and combinations thereof.

15. A water-based binder solution for use in additive manufacturing, comprising:
    a thermoplastic binder comprising a first polymer strand comprising a first functional group and a second polymer strand comprising a second functional group, wherein the first and second functional groups are configured to non-covalently couple the first and second polymer strands;
    from 1 wt % to 5 wt % of a non-aqueous solvent having a boiling point of greater than 100° C. and less than or equal to 175° C. at 1 atm; and
    water.

16. The water-based binder solution according to claim 15, wherein the non-aqueous solvent is present in an amount of from 2 wt % to 4 wt %.

17. The water-based binder solution according to claim 15, wherein the water-based binder solution has a viscosity of from 8 cP to 12 cP.

18. The water-based binder solution according to claim 15, wherein the non-aqueous solvent has a boiling point of less than 175° C. at 1 atm.

19. The water-based binder solution according to claim 18, wherein the non-aqueous solvent is a first non-aqueous solvent having a boiling point of greater than or equal to 150° C. and less than or equal to 175° C. at 1 atm, the water-based binder solution further comprising:
    a second non-aqueous solvent having a boiling point of greater than or equal to 115° C. and less than or equal to 150° C. at 1 atm;
    wherein the first non-aqueous solvent is present in an amount from 1 wt % to 3 wt %, and the second non-aqueous solvent is present in an amount from 2 wt % to 7 wt % based on the total weight of the water-based binder solution.

20. The water-based binder solution according to claim 15, wherein the water-based binder solution is free of solvents having a boiling point of greater than 175° C.

* * * * *